March 5, 1940.   C. R. WASEIGE   2,192,293
BRAKE
Filed Oct. 18, 1937
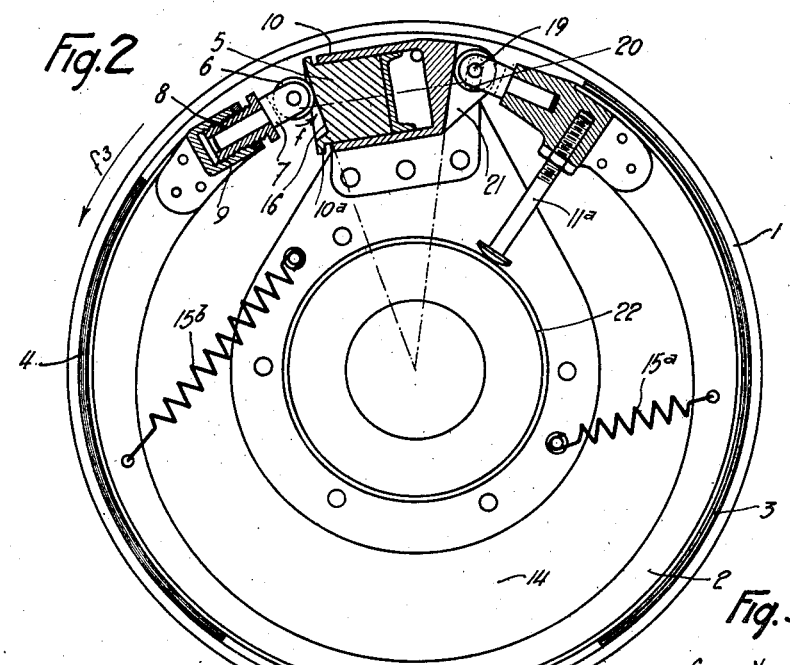
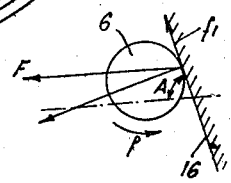
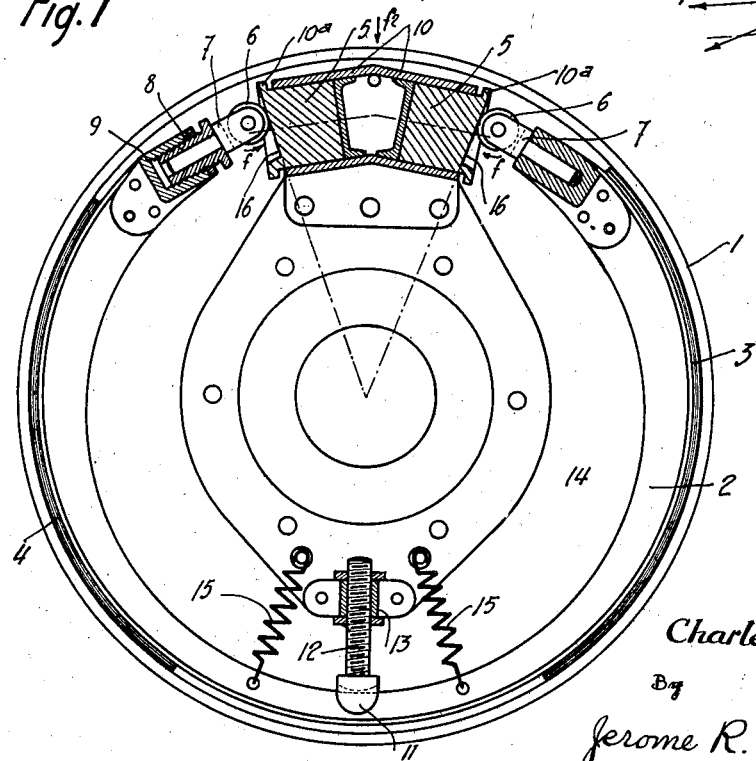
Inventor
Charles R. Waseige
By
Jerome R. Cox
Attorney Patented Mar. 5, 1940

2,192,293

UNITED STATES PATENT OFFICE 2,192,293

BRAKE

Charles Raymond Waseige, Rueil, France, assignor to Bendix Products Corporation, South Bend, Ind., a corporation of Indiana Application October 18, 1937, Serial No. 169,746
In France October 27, 1936

12 Claims. (Cl. 188—78)

The invention relates to brakes and more particularly to self energising brakes for automotive vehicles.

In brakes with an internal friction band embodied therein the radial displacement of the friction band is not identical on its entire periphery. In order to prevent the friction band coming into contact with the drum at certain points when the brake is in normal position an excess amount of play is given to the other points. A big stroke of the operating pedal is required therefore to produce the braking action. On the other hand it is often necessary to effect adjustments of the brakes more particularly in connection with the fact that the maximum wear takes place on the part of the friction band adjacent to the anchorage means.

One object of the invention is to provide a brake in which the friction means end is permitted to shift in operation with respect to the operating means in order that a uniform movement of the various parts of the friction means takes place in operations, thus ensuring a self-centering of the friction means.

Another object of the invention is to provide a brake in which the anchorage means is formed with an inclined ramp adapted to co-operate with a roller carried by the end of the friction means.

Yet another object of the invention is to provide a brake in which the friction means is provided at its end with a roller which cooperates with an inclined ramp formed on an operating piston, said ramp forming at the point of contact with the roller an angle smalled than 90° with the direction of the brake applying effort.

Other objects and features of the invention and other novel combinations of parts and desirable combinations will be apparent from the following description and from the accompanying drawing, in which Fig. 1 is a section of a self-energising brake adapted to be energised in both directions of rotation and shown in operation;

Fig. 2 is a similar section of a self-energising brake adapted to be energised in a single direction of rotation; and Fig. 3 is a diagrammatical view of the stresses generated in operation in the embodiment of Fig. 1.

Referring to the drawing, and more particularly to Fig. 1, the brake includes a drum 1 cooperating with a semi-rigid friction band 2 which is adapted to open as the wear of the brake lining takes place. The lining includes two parts 3 and 4, as in conventional self-energising brakes. Each end of the friction band 2 is connected to a movable piston 5 through the intermediary of a roller 6 mounted on a yoke 7 secured at the end of the friction band. One of the yokes is carried by a threaded sleeve 8 mounted in a threaded portion 9 fixed to the friction band. Each piston 5 is adapted to reciprocate in a fluid operated cylinder 10 and is provided with a flange 10a adapted to anchor on the end of the cylinder. The axis of the piston 5 forms an angle with the horizontal diameter of the drum. The middle part of the friction band is engaged in a yoke 11 carried by a screw 12 threaded in a nut 13 secured on the backing plate 14. The bottom of this yoke forms a stop for the friction band, the middle part of which is pushed towards the centre of the brake by springs 15 extending in a radial direction at each end of this yoke 11.

Each roller 6 is in contact with a corresponding piston 5 by means of a ramp 16 which extends in a substantially radial direction and which in the embodiment shown in Fig. 1 forms the bottom of a slot provided in the piston. The angle A formed by this ramp with the axis of the cylinder is smaller than 90°, so that the effort F exerted by piston 5 on the roller 6 forms a tangential component $f_1$, which tends to turn the roller in the direction $f$, so that the roller tends to roll along the ramp 16 towards the centre of the brake. Thus, thanks to this rolling effect of the rollers 6, the tangential component $f_1$ of the piston tends to shift the friction band bodily in the direction of the arrow $f_2$, instead of opposing this movement as would be the case in the event of contact of the piston with a fixed friction band end. Further, a locking of the brake is avoided due to the fact that, as the friction band is brought into contact with the drum to be carried therewith in a circumferential direction, the friction band end, which anchors in operation on the inclined ramp through the intermediary of the roller is permitted to shift inwardly in a radial direction in the case of any eccentricity existing on the drum.

In the normal position the friction band 2 is supported in three points namely by the two operating pistons 5 which are engaged by the rollers 6 and by the adjustable stop 11 against which the friction band is urged by the return springs 15 which extend symmetrically in a radial direction in order to prevent a floating movement of the band and to act as a positioning means therefor. The friction band is thus kept concentric with respect to the drum and it is therefore possible to reduce to a minimum the initial clearance between these two members as well as the stroke of the operating pedal or lever thus enabling the use of a high transmission ratio whereby the required brake applying effort is reduced to a minimum. After partial wear of the brake lining has taken place the position of the friction band 2 can be adjusted with respect to the drum 1 by adjusting the position of the stop 11 and of the yoke 7 carried by the threaded sleeve 8. The embodiment shown in Fig. 2 differs from the above embodiment due to the use of a single piston 5 located in cylinder 10 which is formed with a ramp 16 acting as an anchorage. A self-energising action takes place in this brake only when the drum rotates in the direction of the arrow $f_3$. In order to prevent the friction means 2 from being carried in operation in the opposite direction the axis 19 of the roller which takes support on the fixed ramp 16 passes through a slot 20 extending in a radial direction and formed in a lug 21 extending from the cylinder 10.

Moreover, the adjustable positioning stop for the band is arranged not in the middle part thereof as in the embodiment of Fig. 1, but at the end adjacent to the fixed ramp and is formed by a threaded pin 11a the head of which takes support on a collar 22 integrally made with the fixed backing plate 14. The spring 15$^a$ urges one end of the friction band against the adjustable stop 11a and against the fixed ramp, while the spring 15$^b$ urges the other end of the friction band against the operating piston which takes support on the cylinder 10 when the brake is in normal position. The friction band is thus supported at three points arranged on the same side of the drum centre.

While two embodiments of the invention have been illustrated and described it is to be particularly understood that these embodiments are to be considered as exemplary and not limitative and that the scope of the invention is to be determined by the claims appended hereto.

What I claim is:

1. A brake comprising in combination a friction means, a fluid operated cylinder, a piston in said cylinder operatively connected to the friction means, an anchorage formed by an inclined substantially radial ramp provided on said cylinder and a roller carried by the friction means and engaging said ramp.

2. A brake comprising in combination a drum, a friction means cooperating with said drum, a fluid operated cylinder, a piston in said cylinder, an inclined substantially radial ramp on said piston and a roller carried by the friction means and engaging said ramp.

3. A brake comprising in combination a friction means, a fluid operated cylinder, an operating space in the cylinder forming an angle with the horizontal diameter of the drum, a piston located in said operating space, an inclined ramp on said piston and a roller carried by the friction means and engaging said ramp.

4. A brake comprising in combination a friction means, a drum, an operating means acting on one end of said friction means, an anchorage, an inclined substantially radial ramp on said anchorage forming an acute angle with the vertical diameter of the drum, a roller on the other end of said friction means and engaging said ramp, an elongated slot formed on the anchorage adjacent said ramp, and a pin carrying the roller and engaging said slot.

5. A brake comprising in combination, a friction means, a drum, a backing plate, an anchorage having a ramp forming an acute angle with a radius of the drum, a roller carried by the friction means and engaging said ramp, a collar formed on the backing plate, a pin secured on the friction means adjacent to the anchorage ramp and extending in a radial direction to engage the collar formed on the backing plate, and a spring urging the friction means against said collar and said anchorage ramp.

6. A brake comprising in combination, a friction means, a drum, a backing plate, an anchorage having a ramp forming an acute angle with the vertical radius of the drum, a roller carried by the friction means and engaging said ramp, a collar formed on the backing plate, a pin secured on the friction means adjacent to the anchorage ramp and extending in a radial direction to engage the collar formed on the backing plate, and a spring urging the friction means against said collar and said anchorage ramp.

7. A brake comprising in combination a backing plate, a drum, a friction means within said drum, a hydraulic cylinder actuating means secured to said backing plate and provided with an anchor having a ramp extending in a plane substantially radially of said drum, and means carried by the friction means for engaging said ramp.

8. A brake comprising in combination a backing plate, a drum, a friction means within said drum, a hydraulic cylinder actuating means secured to said backing plate and provided with an anchor having a ramp extending in a vertical plane substantially radially of said drum, and means carried by the friction means for engaging said ramp.

9. A brake comprising in combination, a drum, a backing plate, a friction means within said backing plate, a hydraulic actuating cylinder secured to said backing plate and provided with a piston, said piston being formed with an inclined ramp forming an acute angle with the perpendicular to the axis of the piston and arranged substantially in a plane radial of said drum, and means carried by the friction means for engaging said ramp.

10. A brake comprising in combination, a drum, a backing plate, a friction means within said backing plate, a hydraulic actuating cylinder secured to said backing plate and provided with a piston, said piston being formed with an inclined ramp forming an acute angle with the perpendicular to the axis of the piston and arranged substantially in a vertical plane radial of said drum, and means carried by the friction means for engaging said ramp.

11. A brake comprising in combination a backing plate, a drum, a friction means within said drum, a hydraulic cylinder actuating means secured to said backing plate and provided with an anchor having a ramp extending in a plane substantially radially of said drum and with a piston having an inclined ramp also extending in a plane substantially radially of said drum, and means carried by the friction means for engaging said ramps.

12. A brake comprising in combination, a drum, a backing plate, a friction means within said backing plate, a hydraulic actuating cylinder secured to said backing plate formed with an anchoring ramp inclined at an acute angle with the perpendicular to the axis of the cylinder and arranged substantially in a plane radially of the drum, and provided with a piston, said piston being formed with an inclined ramp forming an acute angle with the perpendicular to the axis of the piston and arranged substantially in a plane radial of said drum, and means carried by the friction means for engaging said ramp.

CHARLES RAYMOND WASEIGE.